(12) United States Patent
McKeever et al.

(10) Patent No.: US 10,672,362 B2
(45) Date of Patent: Jun. 2, 2020

(54) SYSTEMS AND METHODS FOR DIGITAL CONTENT CREATION AND RENDERING

(71) Applicant: FFIPCO LLC, Old Tappan, NJ (US)

(72) Inventors: Patrick McKeever, Old Tappan, NJ (US); Richard Ferdinand, Old Tappan, NJ (US); Cornelius Shea, Old Tappan, NJ (US)

(73) Assignee: FFIPCO, LLC, Old Tappan, NJ (US)

( * ) Notice: Subject to any disclaimer, the term of this patent is extended or adjusted under 35 U.S.C. 154(b) by 0 days.

(21) Appl. No.: 15/998,863

(22) Filed: Aug. 17, 2018

(65) Prior Publication Data

US 2020/0058263 A1    Feb. 20, 2020

(51) Int. Cl.
| | |
|---|---|
| G09G 5/00 | (2006.01) |
| G06T 5/00 | (2006.01) |
| G06T 17/20 | (2006.01) |
| G06T 15/50 | (2011.01) |
| G09G 5/36 | (2006.01) |
| G06T 15/00 | (2011.01) |

(52) U.S. Cl.
CPC ............. *G09G 5/006* (2013.01); *G06T 5/002* (2013.01); *G06T 5/006* (2013.01); *G06T 15/005* (2013.01); *G06T 15/506* (2013.01); *G06T 17/20* (2013.01); *G09G 5/363* (2013.01); *G06T 2207/20021* (2013.01)

(58) Field of Classification Search
USPC ......................................... 345/423
See application file for complete search history.

(56) References Cited

U.S. PATENT DOCUMENTS

| | | | |
|---|---|---|---|
| 8,023,758 B2* | 9/2011 | Hung ............... | G06T 5/006 356/124 |
| 9,576,553 B2* | 2/2017 | Pauly .............. | G09G 5/02 |
| 2013/0124159 A1* | 5/2013 | Chen ............... | G06T 5/006 703/2 |
| 2015/0244930 A1* | 8/2015 | Ettinger .......... | H04N 5/23222 348/207.1 |
| 2017/0177518 A1* | 6/2017 | Chew .............. | G06F 11/3024 |
| 2018/0296912 A1* | 10/2018 | Hicks .............. | A63F 13/213 |
| 2018/0300839 A1* | 10/2018 | Appu ............... | G06T 1/20 |

* cited by examiner

*Primary Examiner* — Vu Nguyen
(74) *Attorney, Agent, or Firm* — Keith D. Nowak; Carter Ledyard & Milburn, LLP

(57) ABSTRACT

A media engine includes modules to retrieve a first graphics object and a second graphics object to be displayed on a screen, and perform asynchronous pixel transfers of the first graphics object and the second graphics object such that the first graphics object and the second graphics object are shown independently in a single frame, and the asynchronous pixel transfers include batching of draw calls based on the similarity of meshes in the first graphics object and the second graphic object to generate a batch of draw calls.

21 Claims, 17 Drawing Sheets

1100

SYSTEMS AND METHODS FOR DIGITAL CONTENT CREATION AND RENDERING

TECHNICAL FIELD

This disclosure is generally directed to an interactive display of digital content, and more specifically to a highly optimized digital content creation and rendering platform that facilitates creating, rendering, and configuring high fidelity digital content, while using low processing power.

BACKGROUND

Electronic devices, big and small, are integral to the modern world—this is the age of ubiquitous computing, hyper-connectivity, and seamless mobility. An average device user of this day and age, for example, may interact with multiple electronic devices throughout the day. A smart coffee maker may automatically brew coffee based on configuration instructions received from a smartphone through a Wi-Fi network; a smart watch may constantly monitor the movement activity of the user; the smart phone may execute social media and news applications; a television may deliver news and entertainment; advertising screens outside may present information about products and services; kiosks at train stations and stores may also present various advertising items; and the list can go on. With the recent advent of Internet of Things (IoT) devices, the number of electronic devices is bound to grow exponentially.

A large portion of these electronic devices are used for presenting visual content. In other words, almost all of the electronic devices, ranging from a smartwatch to a large electronic billboard have displays of different shapes and sizes. Furthermore, with advances in the touch-screen technology as a substitute physical buttons, the display screens are often the largest components of the electronic devices. The display has therefore become a focal point for a modern day interaction with devices. Every human being is constantly interacting with one display or another throughout his/her waking hours.

These displays coupled to the electronic devices have seen significant improvements over the past few decades. Cathode ray tube (CRT) display technology has given way to displays based on, for example, liquid crystal display (LCD) and light emitting diode (LED) technology. Modern display technology, such as LCD and LED, has allowed for higher resolution displays and hardware manufacturers have been pushing the limits constantly. For example, the gold standard for consumer television just a few years ago was HD (high definition) with a resolution of 1280*720 pixels (abbreviated as 720p) or full HD with a resolution of 1920*1080 pixels (abbreviated as 1020p). As the time of this writing, consumer television industry has moved towards higher resolutions and the typical consumer televisions sets are 4K with a resolution of 4096*2160 pixels and 8K with a resolution of 7680*4320 pixels. Similar strides have been made for smaller consumer devices such as smartphone or tablet computers. For example, each and every smartphone available in the market has a high fidelity display.

However, higher quality displays require higher processing capacity, which may not be readily available in all electronic devices. Higher processing capacity requires more electric power and robust heat management hardware. As the electronic devices are being increasingly untethered—small, hand carried, and not connected to a wall outlet except for charging—device manufacturers face severe constraints in terms of the processing capacity. It will sure be unwieldy for a smartphone to have cooling fan and vents for managing heat for a higher capacity processor. Furthermore, the industry has been steadily moving towards a system on a chip (SoC) model where various other functionality (such as modulation/demodulation, digital signal processing) is incorporated alongside a processing core to realize a complete system on a single substrate. By design, SoC chips have a lower performance compared to the standard desktop computer processors. Therefore, the limitations in processing capacity fail to realize a fuller potential offered by the display technology.

Even larger stationary displays used for advertising such as kiosks or digital billboards also face processing capacity constraints. While kiosks and digital billboards may have a dedicated power source, a higher processing capacity may pose other problems. A larger processing capacity requires a heat management system (often dubbed as "thermals" in the industry). Kiosks and digital billboards are generally outside and exposed to elements. Along with other hardware for these devices, the heat management system has to be made robust enough to withstand heat, rain, snow, and other elements. A more sophisticated heat management system may also be prone to failures and the repairs may be expensive. Furthermore, devices with a lower power consumption footprint are always sought after for obvious reasons.

Conventional development tools for developing digital content also have several technical shortcomings. First, conventional web development tools such as hypertext markup language (HTML) and JavaScript have their security vulnerabilities and therefore may not provide a desired level of security. Second, the conventional web conventional tools such as HTML and Javascript, which are based upon a slow parsing of extensible markup language (XML) are inherently slow and do not provide a desired speed of operation.

SUMMARY

What is therefore desired is a novel digital platform that uses a lower processing capacity to generate multiple, individually interactive, high fidelity digital content across diverse types of hardware platforms such as mobile phones, televisions, advertising kiosks, and billboards.

Embodiments disclosed herein describe a highly optimized media engine that includes (i) a display engine to display interactive digital content and (ii) a development tool for a user to generate and configure the interactive digital content. The media engine provides both central processing unit (CPU) and graphics processing unit (GPU) optimizations such that the interactive digital content may be displayed on low powered devices such as smartphones and display kiosks. The media engine may further be platform-agnostic: configured to be compiled on major compilers; and modular; where individual modules are configured to be modified and updated independently. The display engine, by leveraging the back-end CPU and GPU optimizations may display high fidelity interactive content regardless of the processing power. The development tool may provide widgets that can be accessed and modified using simple scripting languages.

In an embodiment, a system comprises a non-transitory storage medium comprising software modules forming a media engine; a processor coupled to the non-transitory storage medium and executing the software modules to: retrieve a first graphics object and a second graphics objects to be displayed on a screen; generate a first set of one or more central processing unit (CPU) processes for the first graphic object and a second set of one or more CPU processes for the second graphics object; discretize at least one of the first set of CPU processes and the second set of CPU processes into a plurality of discrete computation tasks; determine a number of hardware threads supported by a target processor; and feed the plurality of discrete computation tasks as multiple threads based on the number of the hardware threads supported by the target processor.

In another embodiment, a system comprises a non-transitory storage medium comprising software modules forming a media engine; a processor coupled to the non-transitory storage medium and executing the software modules to: retrieve a first graphics object and a second graphics objects to be displayed on a screen; and perform asynchronous pixel transfers of the first graphics object and the second graphics object such that the first graphics object and the second graphics object can be shown independently in a single frame, the asynchronous pixel transfers including batching of draw calls to a target GPU based on the similarity of meshes in the first graphics object and the second graphics object to generate a batch of draw calls.

In yet another embodiment, a system comprises: a non-transitory storage medium comprising software modules forming a media engine; a processor coupled to the non-transitory storage medium and executing the software modules to: retrieve a first graphics object and a second graphics object to be displayed on a screen; generate a first set of one or more central processing unit (CPU) processes for the first graphics object and a second set of one or more CPU processes for the second graphics object; discretize at least one of the first set of CPU processes and the second set of CPU processes into a plurality of discrete computation tasks; determine a number of hardware threads supported by a target processor; feed the plurality of discrete computation tasks as multiple threads based on the number of the hardware threads supported by the target processor; and perform asynchronous pixel transfers of the first graphics object and the second graphics objects such that the first graphics object and second graphics object can be shown independently in a single frame, the asynchronous pixel transfers including batching of draw calls to a target GPU based on the similarity of meshes in the first graphics object and the second graphics object to generate a batch of draw calls.

BRIEF DESCRIPTION OF THE DRAWINGS

The accompanying drawings constitute a part of this specification and illustrate embodiments of the subject matter disclosed herein.

DETAILED DESCRIPTION

Figure 1:
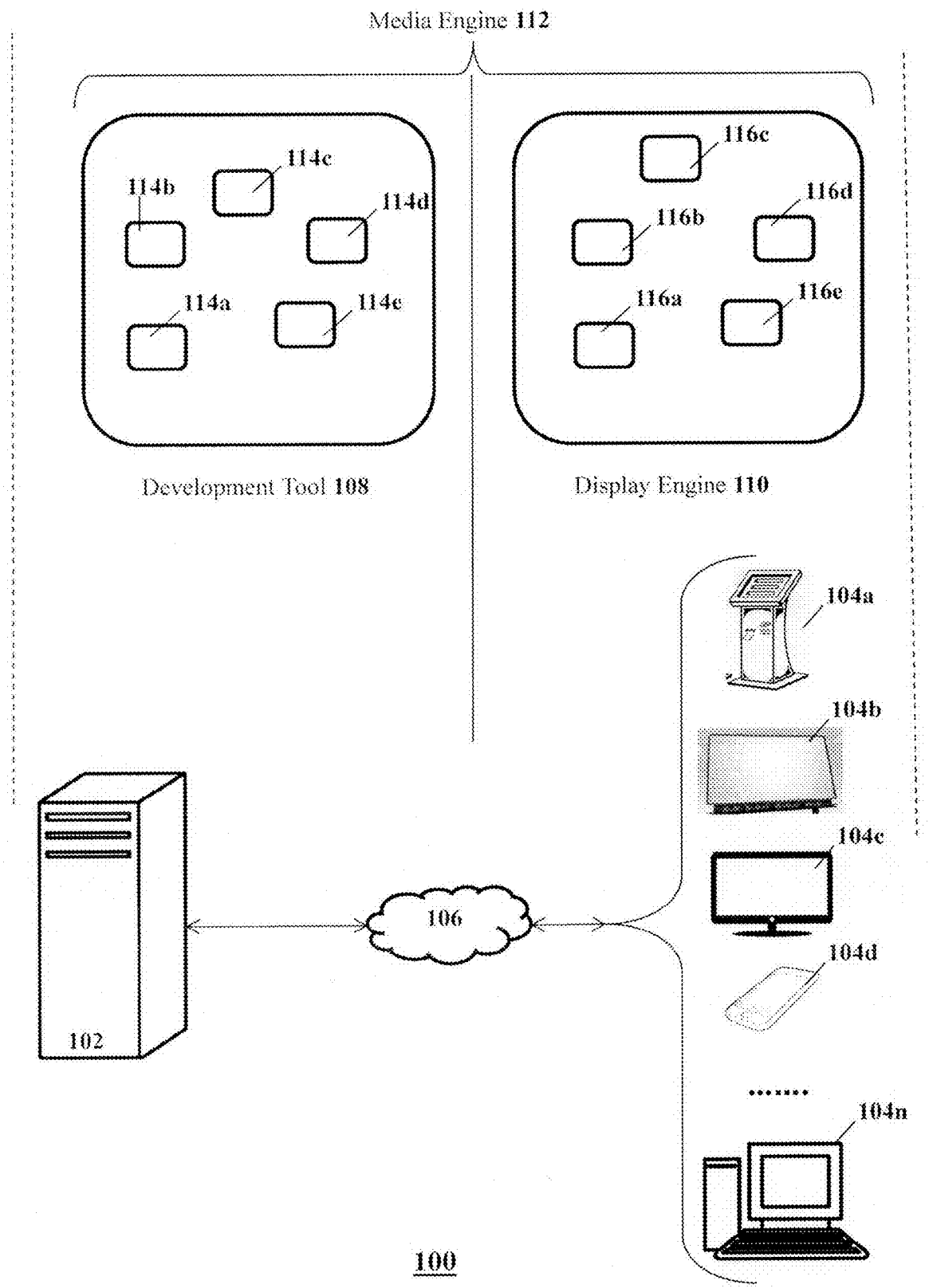
FIG. 1 shows an exemplary network environment for a media engine, according to an illustrative embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented herein.

Embodiments disclosed herein describe a media engine that operate both as display engine and a developmental tool that may be used to develop and display high fidelity, interactive digital media content regardless of the hardware platforms. In other words, the media engine may have no assumptions about the target hardware platform and is configured to adapt itself based upon the capacity of the target platform. Furthermore, the media engine is fully modular, wherein each module of the media engine may be updated, removed, and/or modified independently.

The media engine may provide a full-fledged three-dimensional (3D) graphics, even for hardware platforms with lower processing and graphics capacity. Furthermore, the media engine may provide the 3D graphics in real-time or substantially real-time. In contrast, the conventional visual software solutions require high capacity hardware with good thermal management. When the conventional visual software solutions are used in low power devices, they are severely restricted by the hardware limitations. Furthermore, the 3D graphics provided by the conventional software solutions may not be true 3D but rather stereoscopic rendering of alternate frames for the left and right eyes, requiring additional hardware such as 3D glasses. In addition, the media engine may map a video of a 3D dimensional surface within a screen to generate, for example, a 360° view video sphere.

As a developmental tool, the media engine may significantly reduce development time. The media engine may provide various widgets that a developer may access through simple scripting languages such as Lua. Non-limiting examples of widgets provided by media engine may include a skybox, 360° spheres for mapping images and/or videos, three dimensional (3D) models with animations, webcam, web-browser, canvas, stage, and/or other types of widgets. Using the widgets or other customizations, the media engine may implement a desired logic. A desired logic may include, for example, a puppeteering engine that mimics gestures of a user, a 3D aquarium with 3D fish swimming in it, and/or a 3D rendering of an ice-cream dispenser. By providing the scripting language application programming interface (API), the media engine abstracts away the implementation complexity of the media engine. High fidelity and interactive digital content may be easily and rapidly designed with minimal programming knowledge. However, it should be understood that Lua scripting language is merely an example; and other languages may be used to access and configure the widgets provided by the media engine. For example, the media engine may support codes in C/C++/C# for accessing and configuring the widgets.

The media engine may be highly optimized to generate and display high fidelity digital media content in a hardware-agnostic manner. The optimizations may include both central processing unit (CPU) optimizations and graphics processing unit (GPU) optimizations. For CPU optimizations, the media engine may perform matrix operations using single instruction, multiple data (SIMD) operations. Furthermore, the media engine may discretize the CPU processes as discrete computation tasks on various worker threads and feed in the discrete computation tasks through multiple threads to a CPU. To do so, the media engine may automatically detect the hardware capacity of the CPU, e.g., the number of threads the CPU is configured to process and generate and allocate the discrete computation tasks based on the hardware capacity. For CPU intensive critical portions of the code, the media engine may utilize SIMD resources, such as registers and/or additional resources offered by SIMD operations such that the data remains within the CPU cache/registers and random access memory (RAM) read/write cycles are minimized. In other words, the media engine may keep data closer to the CPU for CPU intensive calculations thereby improving the speed and efficiency of the CPU operations.

For GPU optimizations, the media engine may perform asynchronous pixel transfer to combine multiple video feeds in a single frame. As a part of the asynchronous pixel transfer, the media engine may batch draw calls based on the similarity of meshes to be generated by the draw calls. The media engine may also bypass the synchronization layer of the GPU for a direct state access. As a rendering abstraction layer always has the information on the state of the GPU, state changes can also be minimized. Furthermore, to avoid GPU branching during runtime, the media engine may pre-compile permutations of shaders and store the shaders in the GPU memory. For further optimization, the media engine may pre-compile shaders with predetermined constants, such as radii for blurring shaders or the indices for Gaussian blurring shaders such that a faster performance may be achieved during runtime. For dynamic lighting calculations, the media engine may separate the screen into tiles and implement a light accumulation buffer for each tile to reuse results from previously performed calculations. For portions of the screen that are occluded from the sources of light, the media engine may use a stencil buffer to mask those portions. The media engine may also extract video texture from hardware decoding chips for a true 3D rendering of the video. To approximate a Panini projection, the media engine may apply a barrel distortion filter and apply a cheap Panini effect to the distorted image. For vignette effect, the media engine may identify and pre-calculate the vignette pixel as opposed to filling in pixels in the display and calculating the vignette effect on top of those pixels. For an optimized indirect lighting calculation, the media engine may perform a depth first render pass at full resolution and perform at a quarter of the full resolution to strike a balance between fidelity and performance.

The media engine due to the optimizations may be more efficient compared to the conventional digital platforms. Therefore, even in devices with higher computational powers, the media engine may provide a better functionality of allowing more digital content to be rendered compared to conventional digital platforms. It should also be understood that references to media engine performing one or more steps means that a processor executing one or more modules of the media engine. In other words, the aforementioned optimizations may be in the software of the media engine but the execution of the optimized functionality is performed by one or more processors.

A processor may be a central processing unit (CPU) and/or a graphics processing unit (GPU). The disclosure will describe in terms of certain preferences to execute one or more modules of the media engine in a CPU or a GPU. However, a processor will be understood as an electronic processor that executes computer instructions.

FIG. 1 shows components of an illustrative network environment 100 of a media engine, according to an illustrative embodiment. The illustrative network environment 100 may comprise a server computer 102, client devices 104a-104n (collectively referred to as 104), and a network 106. One or more of the server computer 102, client devices 104, and the network 106 may host a media engine 112 containing a development tool 108 and a display engine 110. In other words, the media engine 112 may be hosted on the server 102, at the client devices 104, or at an additional hardware connected to the client devices 104. In some embodiments, the network environment 100 may support complete virtualization, wherein most of the operations may be performed by the server computer 102, i.e., in the cloud, and the client devices 104 may perform the last mile operations. In other words, the server computer and/or any other component in the cloud may stream processed information to the client devices 104, which, in turn perform one or more client operations such as rendering based on the streamed processed information.

The server computer (or simply "server") 102 of the system 100 may execute various software modules that instruct the server 102 on performing one or more processes for generating and storing digital content. A server 102 may be any computing device comprising non-transitory machine-readable storage media and a processor capable of executing the various processes and tasks described herein. Non-limiting examples of a server 102 may include a server computer, a desktop, a laptop, a tablet, or the like. In some cases, the server 102 may be coupled to one or more databases (not shown) of the system 100, and, in some cases, the server 102 may host the one or more databases.

The client devices 104 may include diverse types of devices, such as a kiosk 104a, a digital billboard 104b, a television 104c, a smartphone 104d, and a desktop computer 104n. It should however be understood that the client devices 104 shown here are merely illustrative and other type of electronic devices should be considered within the scope of this disclosure. The client devices may include a processor (e.g., a central processing unit CPU) and/or a graphics processing unit (GPU) configured to execute one or more client side instructions. The CPU may have any kind of architecture, including but not limited to, x86, x86_64, and ARM.

The network 106 may provide one or more communication channels between the server 102 and the client devices 104. Examples of a network 106 may include, but are not limited to, private or public local area network (LAN), wireless local area network (WLAN), metropolitan area network (MAN), wide area network (WAN), and Internet. The network 106 may include both wired and wireless communications channels according to one or more standards and/or via one or more transport mediums. Communications over the network 106 between the components of the network environment 100 may be performed in accordance with various communication protocols such as Transmission Control Protocol and Internet Protocol (TCP/IP), User Datagram Protocol (UDP), and/or IEEE communication protocols. In one example, the network 106 may include wireless communications according to Bluetooth specification sets, or another standard or proprietary wireless communication protocol. In another example, the network 106 may also include communications over a cellular network, including, e.g., a GSM (Global System for Mobile Communications), CDMA (Code Division Multiple Access), LTE (Long-Term Evolution), and EDGE (Enhanced Data for Global Evolution) network.

In this embodiment, the media engine 112 may function as a development tool 108 and a display engine 110. As a development tool 108, the media engine 112 may provide a plurality of widgets 114a, 114b, 114c, 114d, 114e (collectively referred to as 114) that may accessed and configured using an application programming interface (API) provided by the media engine 112. In some embodiments, the API may be provided to be compatible with a scripting language such as Lua. In other embodiments, the API may be provided to be compatible with other programming languages such as C/C++/C#. Non-limiting examples of widgets 114 provided by media engine may include a skybox, 360° spheres for mapping images and/or videos, three dimensional (3D) models with animations, webcam, web-browser, canvas, stage, and/or other types of widgets. In some implementations, the canvas widget may provide an HTML5 API and may provide a significant performance improvement compared to conventional web-browsers because the back-end optimizations. In some implementations, the media engine 112 may provide a development environment such as a development interface.

When operating as a display engine 110, the media engine 112 may display graphics objects 116a, 116b, 116c, 116d, 116e (collectively referred to as 116). The graphics objects 116 may be high fidelity, interactive, and independent of each other, regardless of the hardware platform provided by network environment 100. The graphics objects 116 may include, for example, a video, a three-dimensional (3D) animation, a still image, a 360 degree video sphere, and/or other graphics objects. As detailed below, the media engine 112 may be highly optimized to render high fidelity and individually interactive graphics objects 116, without assumptions of the underlying hardware technology.

It is understood that in another embodiment, the media engine 112 may not include the development tool 108 and comprises the display engine 110.

The media engine 112 may be executed in any operating system environment, including but not limited to, Windows®, Linux®, and Android®. In some embodiments, the media engine 112 may be written in C++ and may compile on compilers, including but not limited to, Microsoft Visual C++ (MSVC®), GNU compiler collection (GCC®), and Clang®. It should be understood that references to the media engine 112 performing one or more steps should be attributed to one or more processors executing program instructions of the media engine.

Figure 2:
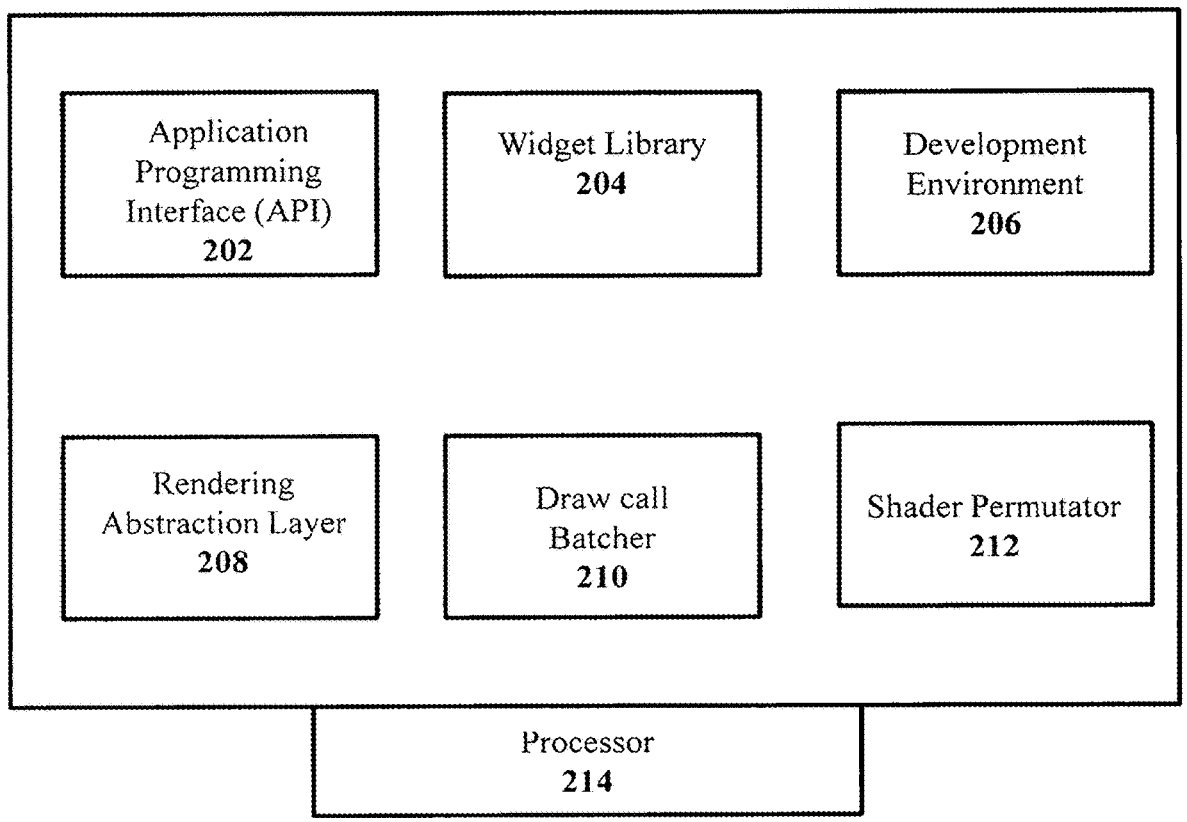
FIG. 2 shows illustrative software modules of a media engine, according to an illustrative embodiment.

FIG. 2 is a block diagram showing illustrative software modules 200 implementing one or more processes described throughout this disclosure. A processor 214 may execute the software modules 200. The software modules 200 may include an application programming interface (API) 202, a widget library 204, a development environment 206, rendering abstraction layer 208, a draw call batcher 210, and a shader permutator 312.

The application programming interface (API) 202 may provide access to various widgets and functionality of a media engine. In some embodiments, the API may be accessed through scripting language such as Lua. In other embodiments, the API may be accessed through other programming languages such as C++. The widget library 204 may store a plurality of widgets that may be accessed and configured using the API 202. Non-limiting examples of widgets may include a skybox, 360° spheres for mapping images and/or videos, three dimensional (3D) models with animations, webcam, web-browser, canvas, stage, and/or other types of widgets. The development environment 206 may provide one or more tools or interfaces for a developer to use the media engine as a development tool. For example, the development environment 206 may provide debugging and test functionality.

The rendering abstraction layer 208 may provide asynchronous pixel transfer, including the batching operations within for the graphics processing unit (GPU). More generally, the rendering abstraction layer 208 abstracts away from the synchronous functionality of GPU to provide an easier interface for GPU operations. The draw call batcher 210 may aggregate a plurality of draw calls based on the similarity of meshes to be generated by the draw calls. In some embodiments, the draw call batcher 210 may be a part of the rendering abstraction layer 208. The shader permutator 212 may pre-compile and load into the GPU memory, all the permutations of the shader for a faster operation during runtime by avoiding GPU branch prediction.

It should be understood that the respective functionality of the aforementioned software modules is merely illustrative and similar functionality may be achieved by fewer, more, or different software modules. Further, certain software modules may be omitted depending on the purpose and function of the media engine. Furthermore, the software modules described herein may achieve alternative and additional functionality, which should be considered to be within the scope of this disclosure.

Figure 3:
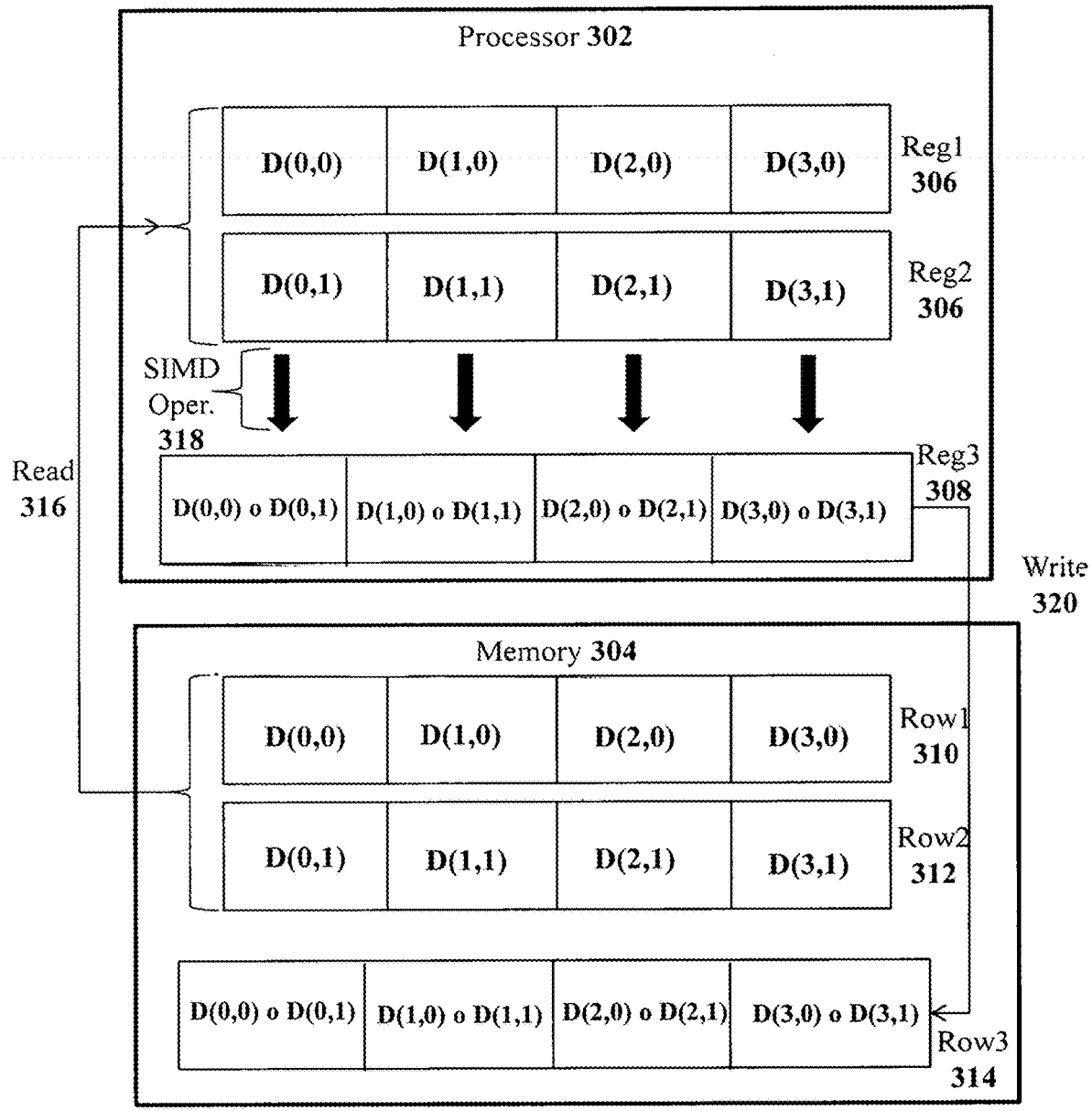
FIG. 3 shows an illustrative single instruction multiple data (SIMD) process, according to an illustrative embodiment.

FIG. 3 shows an illustrative process 300 for a single instruction, multiple data (SIMD) operation, according to an embodiment. Although multiple components of a computer may execute the steps for a SIMD operation, this description details, a processor 302 and a memory 304 executing the steps of the SIMD operation. At the beginning, as shown, the memory 304 may include two memory rows 310 and 312. The first row (or row1) 310 may include four pieces of binary information D(0,0), D(1,0), D(2,0), and D(3,0). For example, if the first row is 64 bits, each of D(0,0), D(1,0), D(2,0), and D(3,0) may contain 16 bits, i.e., 2 bytes. Similarly, the second row (or row2) 312 may include four pieces of binary information D(0,1), D(1,1), D(2,1), and D(3,1). The processor 302 may be configured to determine, at some execution step, that an operation for a piece of binary information from the first row 310 with a corresponding piece of binary information in the second row 312 can be performed independently of the other pairs of pieces of binary information in the first and second rows 310, 312. More specifically, the processor 302 may determine that the pairs of pieces of binary information D(0,0) and D(0,1), D(1,0) and D(1,1), D(2,0) and D(2,1), and D(3,0) and D(3,1) may have parallel operations independent of each other. For the parallel operations, the processor 302 may fetch the pieces of the binary information from the first and second rows 310, 312 of the memory 304 in a read step 316. In a SIMD operation step 318, the processor may perform an operation on the respective pairs of the pieces of binary information D(0,0) and D(0,1), D(1,0) and D(1,1), D(2,0) and D(2,1), and D(3,0) and D(3,1) in parallel to generate the corresponding results D(0,0) o D(0,1), D(1,0) o D(1,1), D(2,0) o D(2,1), and D(3,0) o D(3,1). It should be understood that "o" as used herein may include any kind of operation such as a binary addition, a binary multiplication, a binary subtraction, a binary division, and/or any other form of arithmetic or logic operation. In a write step 320, the processor 302 may write the results D(0,0) o D(0,1), D(1,0) o D(1,1), D(2,0) o D(2,1), and D(3,0) o D(3,1) to a third row (row3) 314 of the memory 304.

The SIMD operation, as shown in the process diagram 300 is significantly faster than a conventional non-SIMD operation. In a conventional operation, the processor 302 may have to execute three processor cycles for each operation: a read cycle such as 316, an operation cycle such as 318, and a write cycle such as 320, thereby having 12 cycles to complete the operations on all the four pairs of the pieces of binary information. SIMD requires mere three cycles as all the four operations on the four pairs of pieces of binary information are done in parallel in a single SIMD operation 318. Therefore SIMD, such as shown in the process diagram 300 may be significantly faster than non-SIMD conventional operations. The matrix calculations for the embodiments disclosed herein may be optimized using the SIMD operations.

Figure 4:
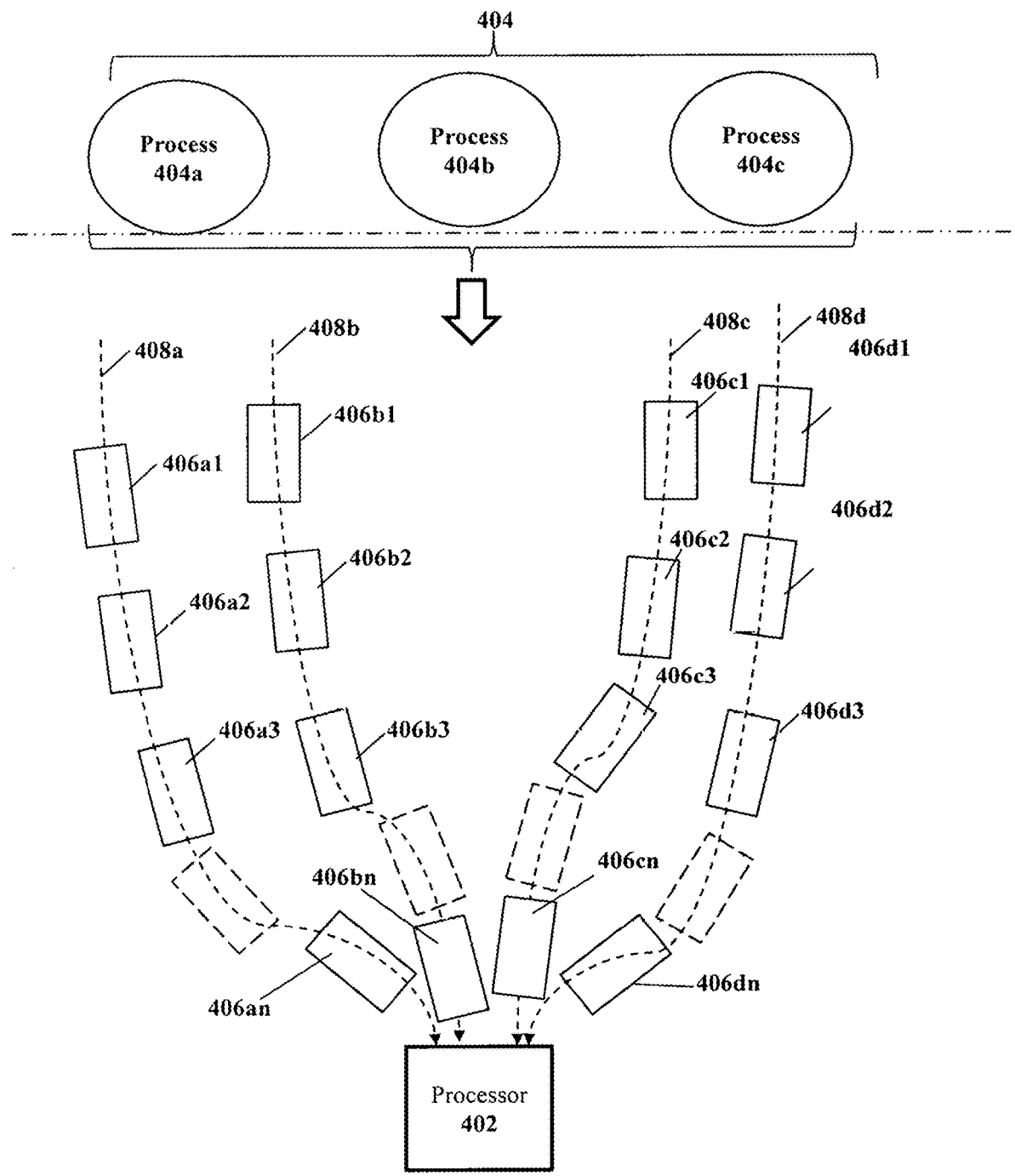
FIG. 4 shows an illustrative worker-computation task-thread process, according to an illustrative embodiment.

FIG. 4 shows an illustrative process 400 of a central processing unit (CPU) operation optimization, according to an illustrative embodiment. An illustrative media engine may discretize processes 404 into discrete computation tasks 406 across multiple threads 408. In other words, the media engine may implement a computation task-based threading model. For example, a process 404 may include multiple calculations to be performed by the processor 402, each calculation to be performed in a cycle of the processor 402. Based on the separability of these calculations, the media engine may separate the processes 404 into multiple discrete computation tasks 406. For instance, the media engine may discretize the process 404a into computation tasks 406a1, 406a2, 406a3, . . . 406an. The media engine may spawn a thread 408a for to feed the computation tasks 406a1, 406a2, 406a3, . . . 406an into the processor 402. The media engine may dynamically spawn as many threads 408a, 408b, 408c, 408d as need on an as-needed basis, subject to the hardware capacity, thereby making the execution of the processes 404 scalable. The media engine therefore may dynamically configure itself based on the hardware capacity of the processor 402 executing the processes 404. The processor 402 as shown herein may be any type or processor with any type of architecture including, but not limited to, x86, x86_64, and advanced RISC machine (ARM). However, because the process 400 is hardware-agnostic and may automatically adapt to the hardware capacity of the processor 402, the process 400 contemplates any future developed processor which should also be considered to be within the scope of this disclosure.

An illustrative optimization may be to force the processor to use the cache lines as opposed to a slower random access memory (RAM). There may be critical portions of the code, which may be processor intensive continuously consuming processor resources. The read cycles from the RAM and the write cycles thereto may be very slow in light of the criticality of execution. For example, repetitive calculations on a batch of data may be processor intensive, and it may be efficient to use the processor registers and processor cache for these types of calculations.

Figure 5:
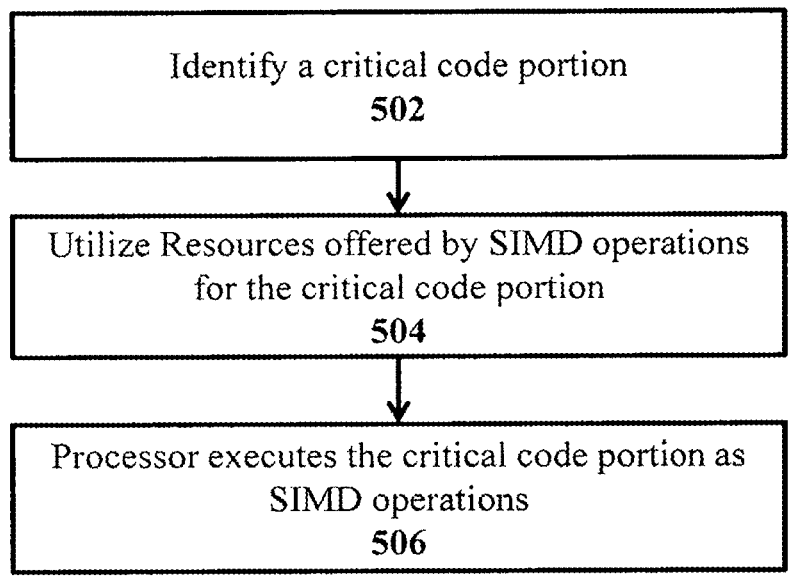
FIG. 5 shows an illustrative method of CPU optimization of using CPU cache/registers for intensive calculations.

FIG. 5 shows an illustrative method 500 for optimizing processor operation, according to an illustrative embodiment. Although multiple software modules and/or hardware modules may implement various steps of the method, this description details, for brevity, a media engine implementing the steps described below. Furthermore, the steps described herein are merely exemplary and methods with additional or alternative steps or missing one or more steps should be considered within the scope of this disclosure.

The method 500 may begin at step 502, wherein the media engine may identify a critical portion of the code. The critical portion of the code may include code for repeated mathematical calculations or any other processor intensive computations on a dataset. At step 504, the media engine may utilize SIMD resources, such as registers and/or additional resources offered by SIMD operations for the critical code portion. In other words, the media engine may load multiple pieces of binary information configured to be executed by parallel operation of an opcode into the processor cache or the processor registers. At step 506, the processor may execute the critical portion as SIMD operations. That is, the processor may perform parallel operations on the multiple pieces of binary information stored in the cache or registers with minimal read and write operations to RAM or other slower memories.

As described above, an illustrative media engine may render multiple video feeds and/or any other type of media content in a single three dimensional (3D) frame. The multiple video/media field may be configured to independent of each other. The media engine may perform an asynchronous pixel transfer optimization for a more efficient and faster processing.

An illustrative media engine may include an abstraction layer for rendering. It is known that graphics processing units (GPUs) are synchronous state machines. Synchronous state machine operations are generally slow and unsuitable for highly optimized media environment. The abstraction layer therefore is configured to make the GPU operations seemingly asynchronous through the use of asynchronous pixel transfers by batching GPU operations using command buffers, as described below. Furthermore, GPU state may always be available to the abstraction layer; therefore GPU state queries that may slow down GPU operations may not be necessary. Furthermore, the abstraction layer may avoid GPU state changes unless it may be absolutely necessary, using direct state access (DSA).

Figure 6:
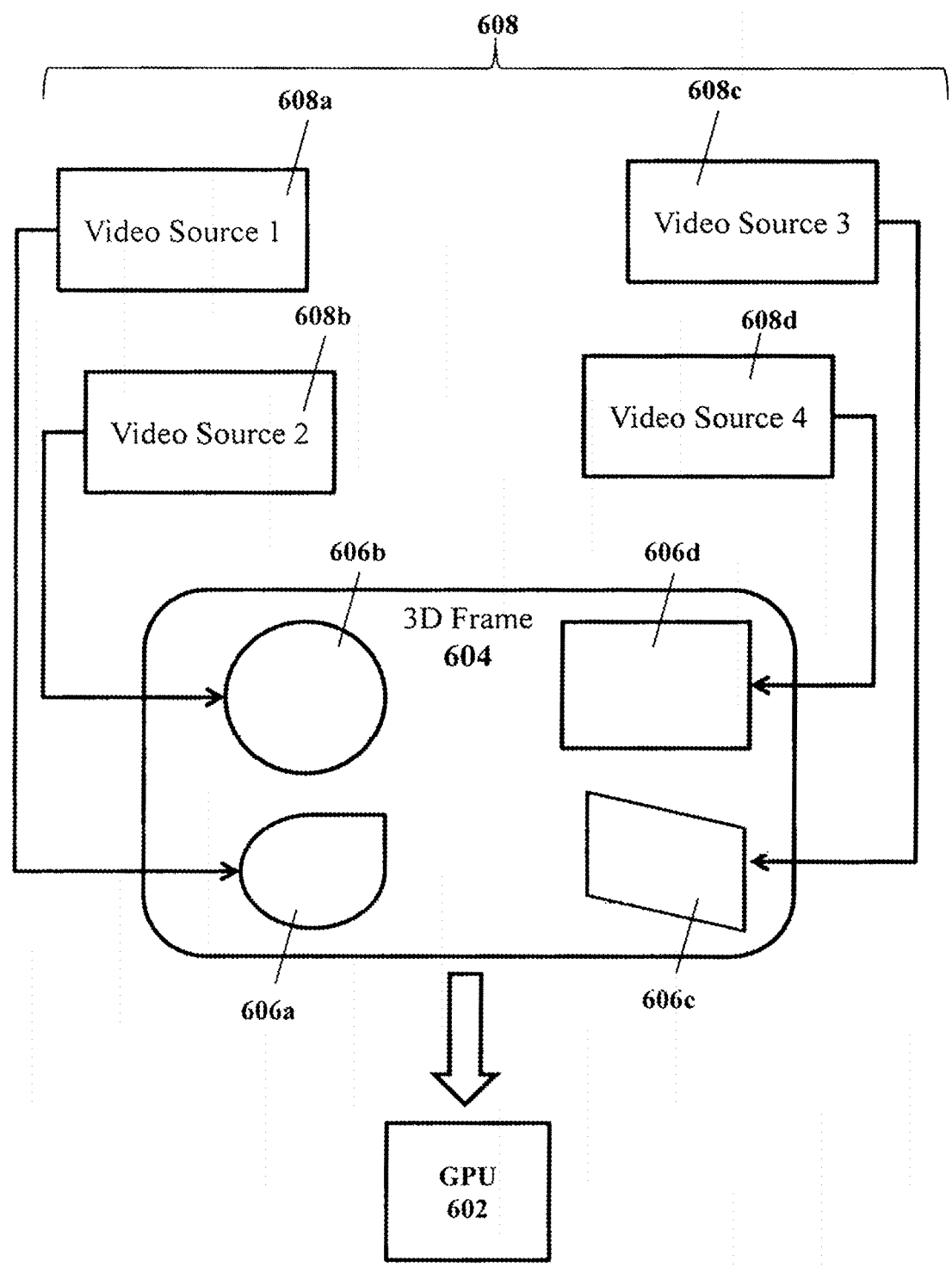
FIG. 6 shows an illustrative process for asynchronous pixel transfer, according to an illustrative embodiment.

FIG. 6 shows an illustrative process 600 for asynchronous pixel transfer, according to an illustrative embodiment. As shown, a graphics processing unit (GPU) 602 may have to render four video feeds from a first video source 608a, a second video source 608b, a third video source 608c, and a fourth video source 608d. One or more of the video sources 608 may be video data files to be converted into pixel domain for rendering. The GPU 602 may have to render the video feeds from the video sources 608 as independent video objects 606a, 606b, 606c, 606d in the 3D frame 604. More specifically, the GPU 602 may have to render: video feed from the first video source 608a as a first video object 606a, video feed from the second video source 608b as a second video object 606b, video feed from the third video source 608c as a third video object 606c, and video feed from the fourth video source 608d as a fourth video object 606d. The media engine may upload the data from the video sources 608 in one GPU call for the 3D frame 604. More specifically, the media engine may upload pixel data from each of the video sources 608 and/or one or more associated shaders for each of the video objects 606 for the GPU 602 to process and render in parallel such that the GPU 602 shows multiple independent video objects 606 simultaneously. In other words, the process 600 becomes a non-blocking single threaded operation. It should be understood that the media engine may be configured for any kind of GPU 602 hardware. As shown, the limitations for the number of video sources 608 may be limited only by processing capacity of the GPU 602.

Figure 7:
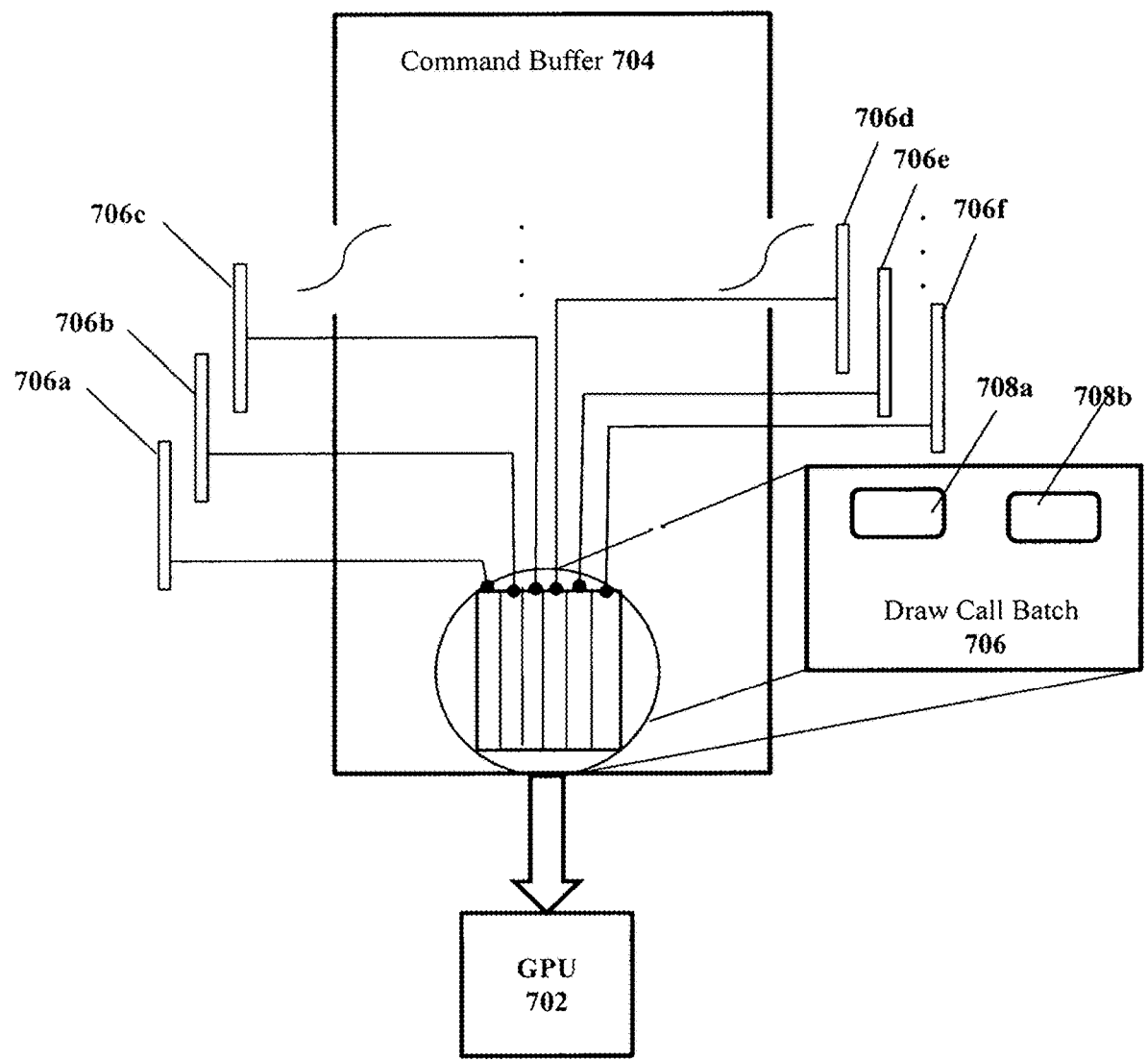
FIG. 7 shows an illustrative command buffer for providing GPU commands to a GPU, according to an illustrative embodiment.

FIG. 7 shows an illustrative command buffer 704 providing graphics processing unit (GPU) commands to a GPU 702. An illustrative media engine may batch draw calls in the command buffer 704 based on the similarity of meshes to be rendered in a frame. For example, there may be two graphics objects 708a, 708b in a frame, wherein the graphics objects 708a, 708b may share materials across their respective meshes. A mesh as described herein may be a three-dimensional (3D) mesh formed by 3D triangles. However, it is generally understood that the mesh is not limited to triangles and other geometries may be used. Here the 3D triangle will be used for illustrative purposes only. Also, color will be used as material for illustrative purposes only. A 3D triangle may include pixels having the same color shade, i.e., uses one shader, in different graphical objects. As opposed to having separate grouping of draw calls in the GPU 702 for the different objects, the media engine may batch draw calls based on the similarity of meshes across the objects 708a, 708b. More specifically, a first set of draw calls 706a, 706b, 706c may be associated with the first graphics object 708a and a second set of draw calls 706d, 706e, 706f may be associated with the second graphics object 708b. The media engine may determine that the first sets of draw calls 706a, 706b, 706c and the second set of draw calls 706d, 706e, 706f are sufficiently similar such that they can be batched together in a draw call batch 706. As an example, a slight deviation in color shade but within a predetermined tolerance based on design specification may be considered sufficiently similar and may be batched together. The media engine may then place the draw call batch 706 in the command buffer 704.

An illustrative media engine may further optimize GPU operations using an illustrative command buffer. More specifically, GPU operations may be compiled into the command buffer and sent once per frame. The command buffer may also abstract GPU operations until the end of generating the frame. In other words, a virtual rendering may be done in the command buffer before the physical rendering on the screen. This flexibility allows the media engine to readily adapt to new rendering APIs.

Figure 8:
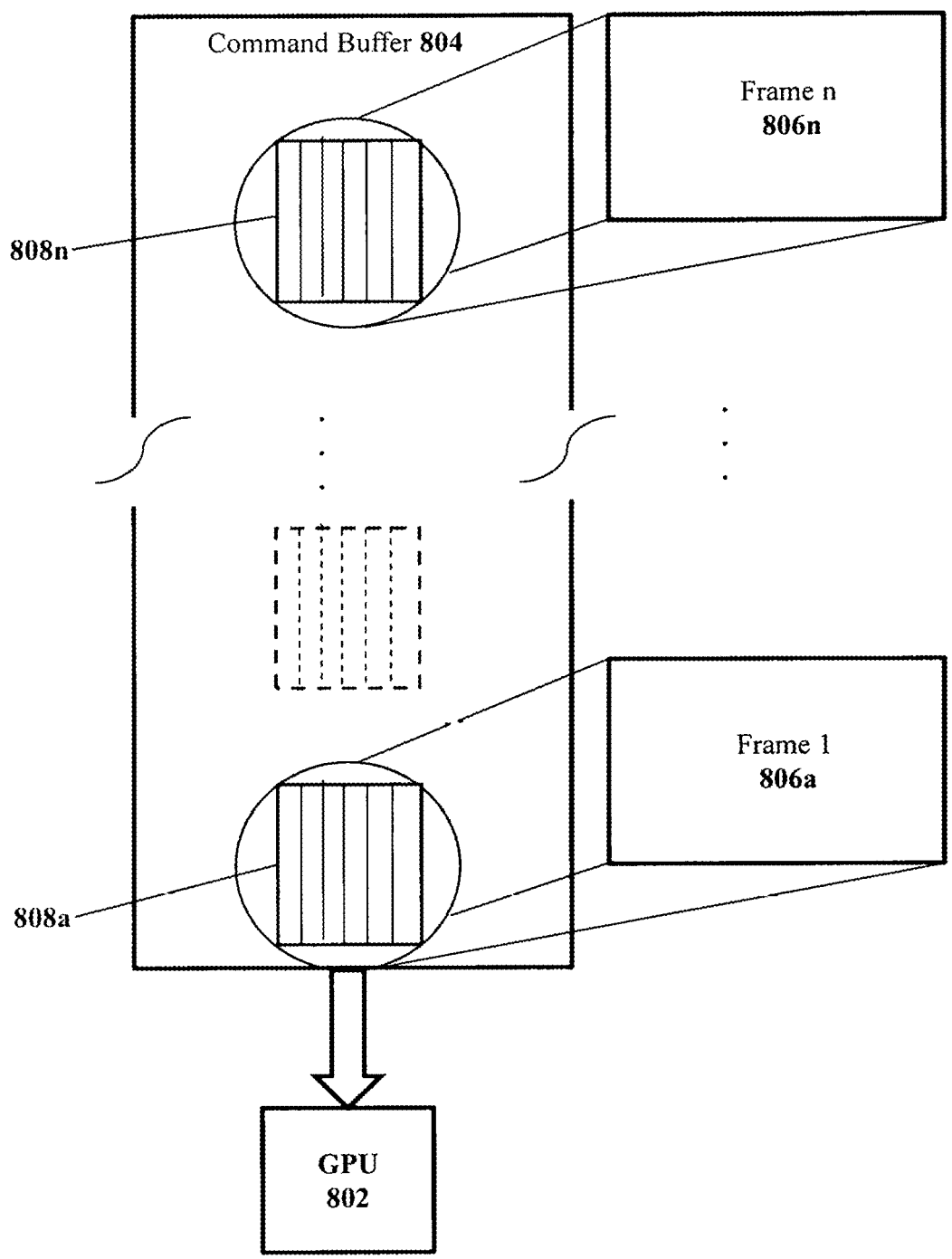
FIG. 8 shows an illustrative command buffer for providing GPU commands to a GPU, according to an illustrative embodiment.

FIG. 8 shows an illustrative command buffer 804 providing GPU commands to a GPU 802. In this illustration, GPU operations to be executed by the GPU 802 may be compiled into command buffer per frame: for a first frame 806a, a first set of aggregated GPU operations 808a may be generated, and so on up to an $n^{th}$ frame 806n, where an $n^{th}$ set of aggregated GPU operations 808n may be generated. The media engine may feed the first and up to $n^{th}$ sets of aggregated GPU operations 808a, . . . 808n associated with first and up to frame n to be rendered by the GPU, thereby making the GPU operations significantly faster than conventional methods. In other words, a virtual rendering of the frames 806a. . . 806n is already done on the command buffer 804, and the GPU may perform a physical rendering of the virtually rendered frames.

In some embodiments, an illustrative media engine may implement direct state access (DSA) in one or more of the GPUs 602, 702, 802. Using DSA may allow the media engine to bypass synchronization layers of the GPUs 602, 702, 802 with a benefit of a performance improvement. In other words, one or more the GPUs 602, 702, 802 may implement an error check and/or a synchronization check for every operation, and by using DSA, the media engine may bypass the error check and/or the synchronization check to improve upon the performance of the GPUs 602, 702, 802.

Figure 9:
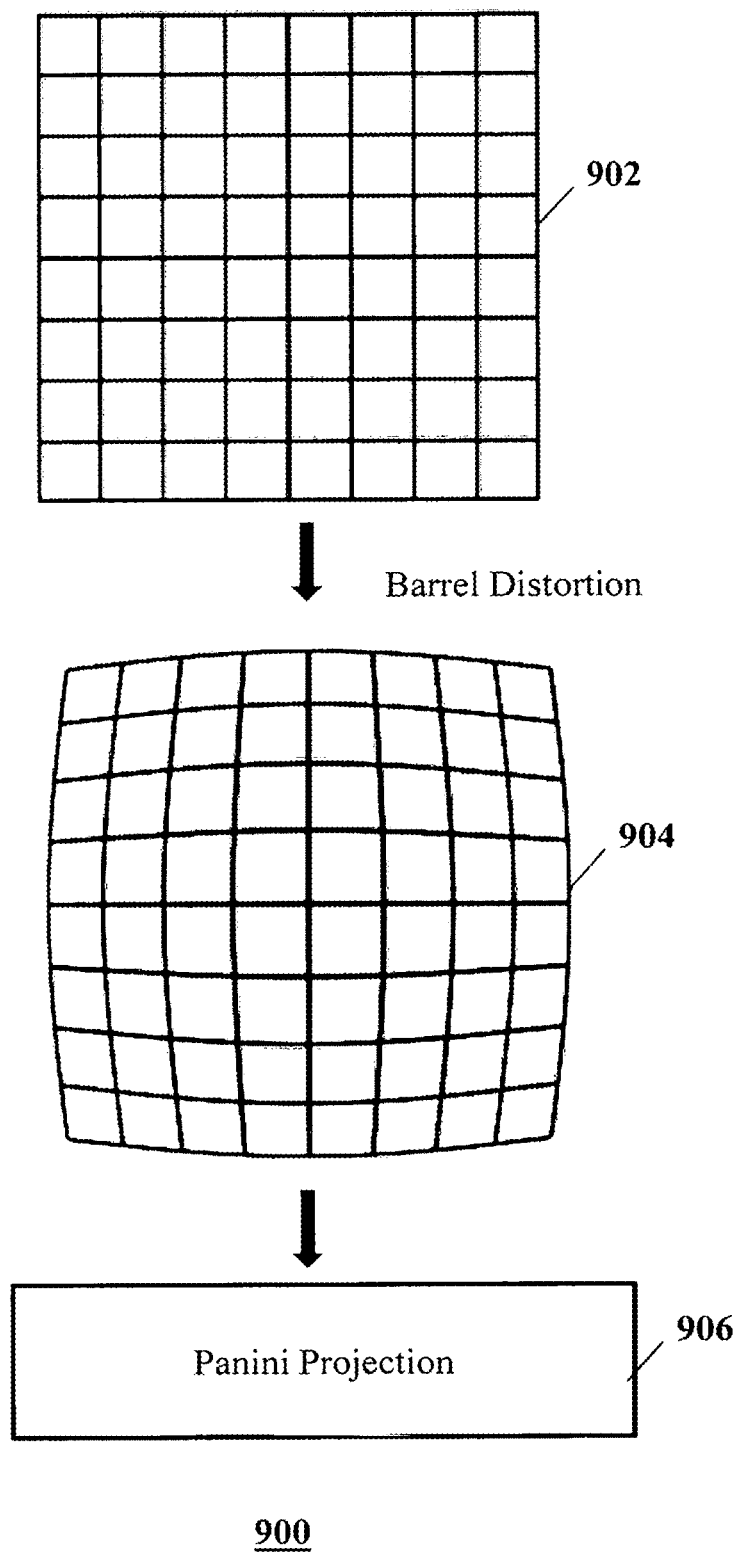
FIG. 9 shows an illustrative process of applying barrel distortion with a less-intensive Panini effect for a projection, according to an illustrative embodiment.

It is understood that conventional Panini projection for image/video rendering is computationally expensive. To generate a Panini like effect but with less intensive computation, an illustrative media engine may apply a barrel distortion to an image/video and apply a Panini projection. FIG. 9 shows a process 900 as implemented by the media engine. As shown, the media engine may apply a barrel distortion to a normal graphics object 902 to generate a distorted object 904. The media engine may further apply a Panini projection 906 to the distorted graphics object 904 to generate a Panini like effect. As a result, the media engine may generate a Panini like effect that may be computationally less intensive than conventional Panini projections. In some embodiments, the media engine may perform two-thirds of projection calculations to generate the distorted graphics object 904 and perform one-third of the projection calculations to generate a final Panini like effect. Therefore, compared to the conventional Panini projection, the computation costs may be reduced by two-thirds. In some embodiments, the media engine may allow a user to switch between a conventional Panini projection and an approximation that applies a barrel distortion and a Panini projection.

The memory allocation functionality provided by operating system may be inefficient and may cause videos displayed by an illustrative media engine to stutter. For example, in a kiosk environment displaying advertisements, if a new advertisement is loaded when an old one is being rendered, videos in the rendered advertisement may freeze due to the GPU overload. To avoid this inefficiency, the media engine may perform a smart allocation of memory during the points where the stutters may not be detected. For example, the media engine may upload video to the GPU when there is a change in the scene of a video being rendered. Furthermore, to avoid memory fragmentation, the media engine may decode and upload any received media file to the GPU memory, as opposed to storing the decoded media file in the system memory. Content from the decoded media file may be rendered and discarded from the GPU memory after rendering by the GPU.

Figure 10:
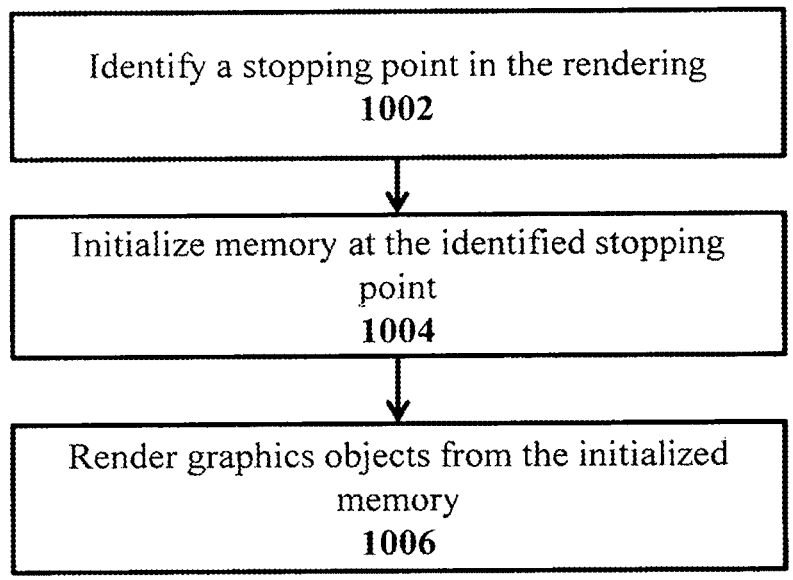
FIG. 10 shows an illustrative method of dynamic memory allocation, according to an illustrative embodiment.

FIG. 10 shows an illustrative method 1000 of dynamic memory allocation, according to an illustrative embodiment. The method may begin at step 1002, wherein the media engine may identify a stopping point in the rendering. The stopping point may be, for example, when the graphic object displayed during rendering is changing. For instance, a video scene may be changing or an existing video feed may be switching to a new video feed. Any stutter during such stopping points, e.g., a small time lag during the switching, may not be visible to human eye. At step 1004, the media engine may initialize memory at the identified stopping point. Such initialization may not cause visible stutters in the video being rendered. At step 1006, the media engine may render graphics objects from the initialized memory. In some embodiment, the media engine may use buddy memory as known in the art for dynamic memory allocation.

Conventional dynamic lighting calculations is performed using deferred rendering because a GPU may not be able handle such calculations during the rendering. However, an illustrative media engine, optimized for hardware with lower processing capabilities may not have sufficient memory and processing power for a deferred rendering. For example, mobile phone may not have memory bandwidth for deferred rendering. As such, the media engine may use a forward+ rendering using a light accumulation buffer and a stencil buffer. Forward+ rendering may allow a plurality of dynamic lights but without the cost of traditional forward rendering. Using the forward+ rendering, the media engine may split screens into tiles for a more localized dynamic lighting calculation. More specifically, the media engine may identify tiles wherein dynamic light has changed from a previous frame and perform dynamic lighting calculations on the identified tiles. In other words, the media engine may restrict the dynamic lighting calculations to tiles with dynamic lighting activity.

Figure 11:
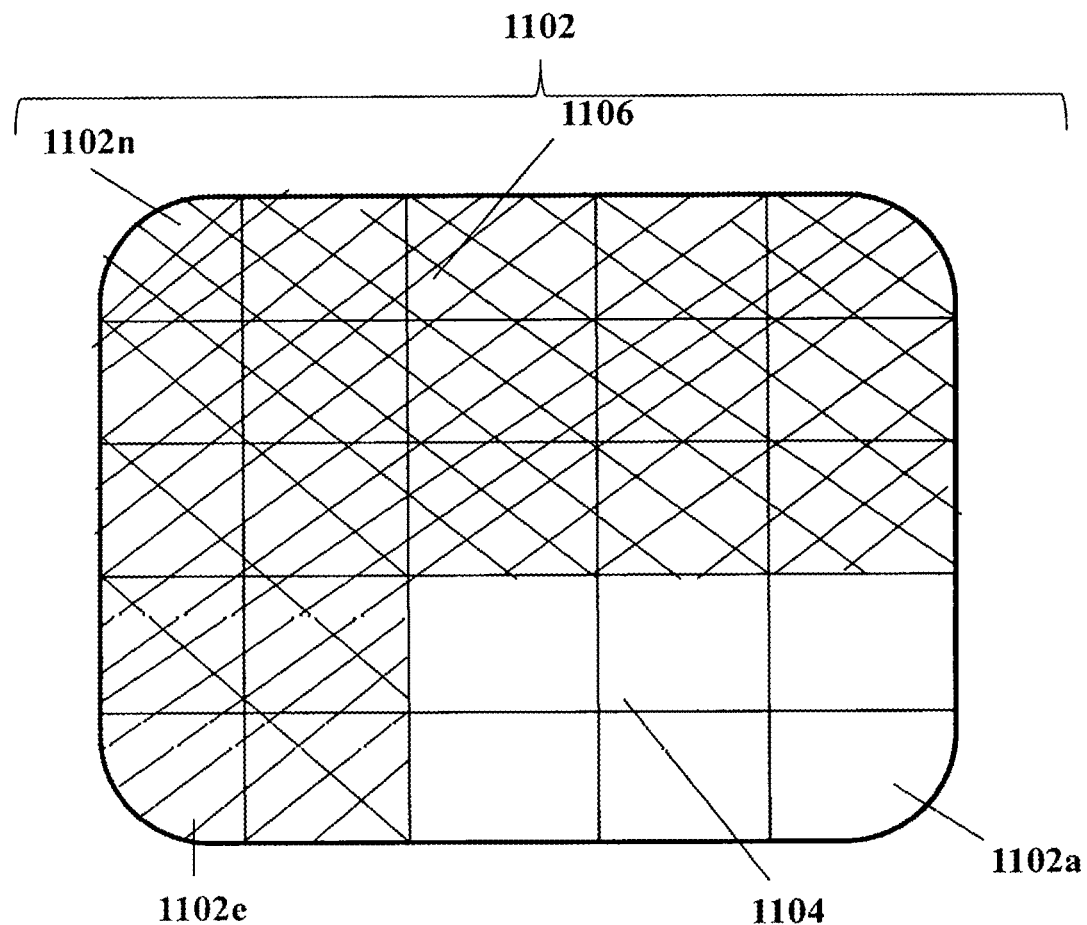
FIG. 11 shows an illustrative screen with a plurality of tiles and a stencil buffer used to mask a subset of the plurality of tiles, according to an illustrative embodiment.

FIG. 11 shows an illustrative screen 1100 wherein the media engine has implemented aspects of forward+ rendering. As seen in FIG. 11, the media engine may have divided the screen 1100 into tiles 1102. Illustrative tiles 1102a, 1102e, 1102n have been shown for reference. In some embodiments, the media engine may divide the screen 1100 into tiles dynamically based on what is rendered in the screen 1100 and/or underlying hardware capacity. The media engine may implement a light accumulation buffer for each of the tiles 1102 to perform dynamic calculations prior to the rendering of the tiles. The dynamic lighting calculations for one or more tiles 1102 may overlap for successive frames, and the media engine may use previous calculations for future frames. For example, if the dynamic lighting does not change for a tile 1102a for five successive frames, the media engine, as opposed to performing the dynamic light calculations for five times, may perform the calculation once for the first frame, cache the result in the buffer and use the cached result for the four frames.

The media engine may further optimize dynamic light calculations based on occlusion calculations. For example, portions of frame displayed in the screen 1100 may be occluded from the sources of the dynamic lights. The media engine may use a stencil buffer to mask out the pixels and/or tiles occluded from the sources of the dynamic lights. As shown herein, 1106 may be a stencil buffer used to mask out occluded portion from dynamic light calculations. Two illustrative tiles 1102e, 1102n are shown to be within the portion that may have been masked out. The media engine may perform the light calculations only for the non-masked portion 1104 of the frame. An illustrative tile 1102a is shown to be within the non-masked portion 1104 of the frame. Although FIG. 11 shows the masked portion 1106 and non-masked portion 1104 coinciding with the tile boundaries, this is for an ease of explanation. The masked portion 1106 and the non-masked portion 1104 may not necessarily follow the tile boundaries and may be performed at pixel level.

An illustrative media engine may have to render multiple instances of same graphic objects in a frame. For example, the media engine may have to render a battle with multiple soldier graphics objects with some alterations of positions and/or other attributes of the soldier graphics objects. In such situations, draw calls for every single instance may be hugely inefficient.

Figure 12:
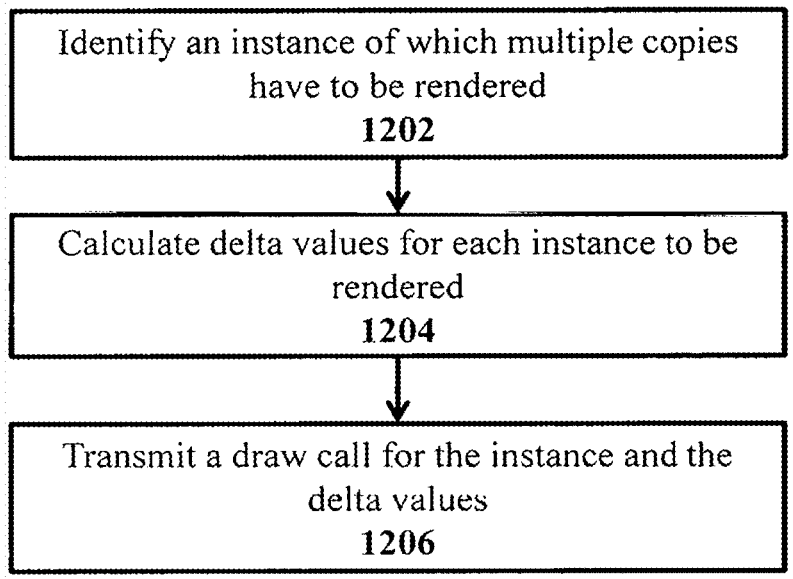
FIG. 12 shows an illustrative method of instancing, according to an illustrative embodiment.

FIG. 12 shows an exemplary method 1200 of rendering multiple copies of a same instance. The method may begin at step 1202, wherein the media engine may identify an instance of which multiple copies may have to be rendered on a frame. At step 1204, the media engine may calculate delta values for each instance to be rendered. There may be some changes associated with each instance. For example, an instance may have a different position, different location, and/or different color. At step 1206, the media engine may transmit a draw call for the instance and the delta values. Using these inputs, a GPU may have to a single set of calculations for the instance and only the delta calculations for the changes to the instance, thereby improving upon the performance of the GPU.

Shaders may be programs executed by GPUs for generating a desired amount of color shading, e.g., appropriate amount of light, darkness, or color in an image. Every draw call may be associated with a shader. Using one or more shaders, a GPU may calculate graphics features such as calculating reflection on a material, calculating transparency of windows, and/or any other type of shadowing. As known in the art, shaders may be pixel shaders, fragment shaders, vertex shaders, and compute shaders. When different shaders are used in a graphical object, there may be significant performance hit at the GPU because of the branch prediction problem associated with GPU. More specifically, if there are conditional statements associated with shaders to be executed by a GPU, the GPU may execute all the conditions and then select a condition that fits. The execution of all conditions and the selection after execution may be a waste of GPU resources.

Figure 13:
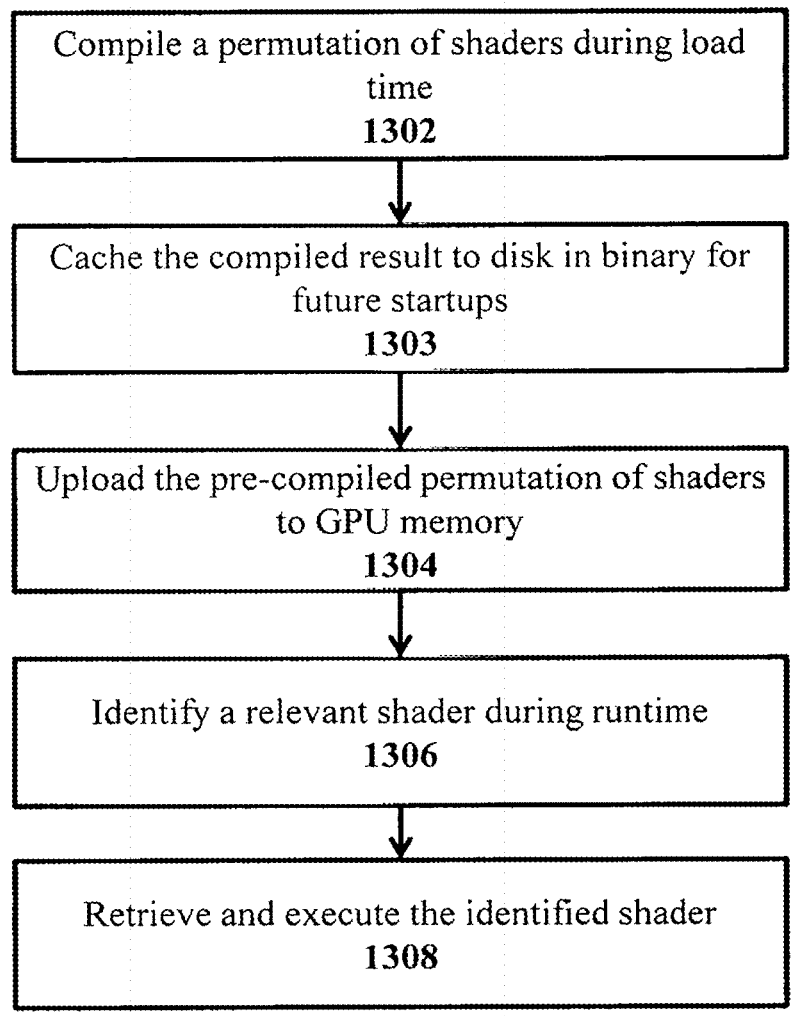
FIG. 13 shows an illustrative method of shader permutation, according to an illustrative embodiment.

To avoid the aforementioned problem, an illustrative media engine may implement a shader permutation method, pre-compiling a permutation of shaders during load-time of the media engine. FIG. 13 shows an illustrative shader permutation method 1300. The method 1300 may begin at step 1302, where the media engine may compile a permutation of shaders during a load-time of the media engine. For example, a particular graphics object may require a shader to do three things: generating a color, generating a reflection, and casting a shadow. Instead of providing conditionals to the GPU, the media engine may pre-compile all the combinations of the shaders: (1) color and reflection, (2) color and shadow, (3) reflection and shadow, (4) no color and reflection, (5) no color and shadow, (6) no reflection and color, (7) no reflection and shadow, (8) no shadow and color, and (9) no shadow and reflection. At step 1303, the media engine may cache the compiled result to disk in binary for future startups. In other words, the media engine during runtime may upload the cached binaries to the GPU during runtime without the need to compile the shaders. At step 1304, the media engine may upload the pre-compiled permutation of shaders to GPU memory. GPU memory may be readily available without significant computational cost. At step 1306, the media engine may identify a relevant shader during runtime, based on user inputs or any other triggers during runtime. For example, a draw call syntax may have information identifying a relevant shader. At step 1308, the media engine may retrieve and execute the identified shader. More specifically, the media engine may transmit the retrieved pre-compiled shader to the GPU for the GPU to execute the shader. For the GPU's supporting pre-compiled shaders, the media engine may already include pre-compiled shaders and skip the steps 1302 and 1304. In some embodiments, the shaders may be compiled once during an initial loading of the media engine and stored in a binary format. At each subsequent loading the media engine, the binary shaders may be uploaded to the GPU memory for a fast access of the binary shaders.

As described above, an illustrative media engine may render graphics objects in a 3D environment. Therefore, one or more videos may have to be displayed at a desired orientation and not just a flat overlay as shown by conventional devices. Videos shown in a 3D environment may have to map to various 3D surfaces at various orientation and not be limited to a shrinkable flat overlay.

Figure 14:
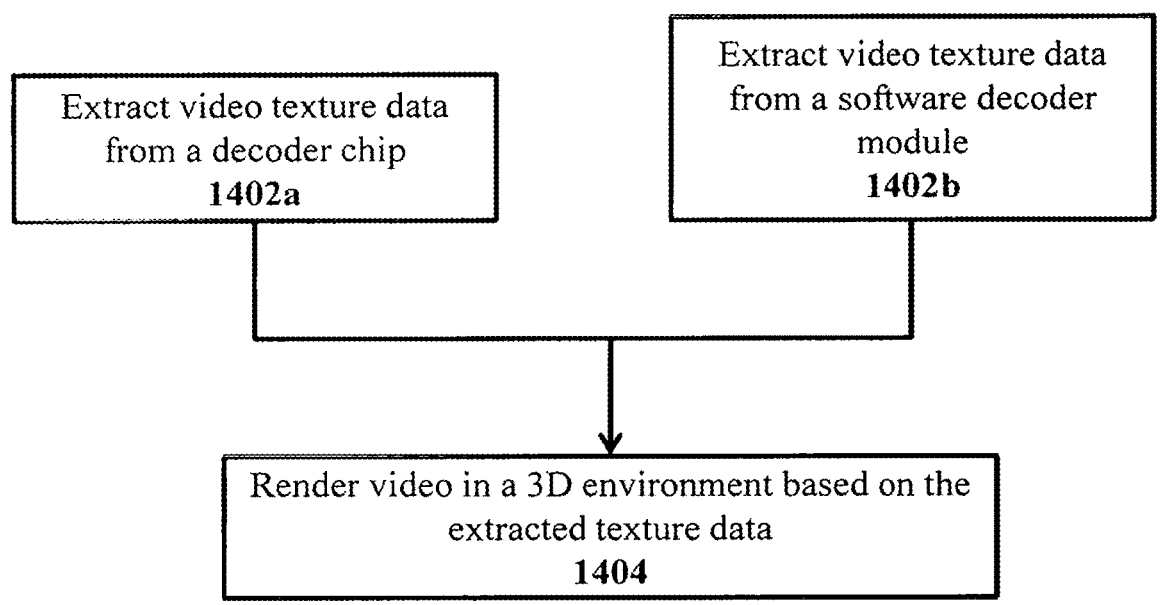
FIG. 14 shows an illustrative method of extracting video texture data from a decoder chip, according to an illustrative embodiment.

FIG. 14 shows an illustrative method 1400 for displaying a video in a 3D environment. The method 1400 may begin at step 1402*a*, where the media engine may extract video texture data from a decoder chip. The decoder chip may be, for example, configured to decode video streams in any format such as .mp4, .mov, .webm and/or .wmv. Using the API of the decoder chip, the media engine may directly extract the hardware texture data and store in a RAM. At an alternative step 1402*b*, the media engine may extract video texture data from a software decoder module. At step 1404, the media engine may render the video in a 3D environment based on the extracted texture data. For example, a first graphical object may be a dinosaur walking on a screen, and the media engine may map the extracted texture data to the skin of the walking dinosaur.

An illustrative media engine may recognize efficiencies when some of the constants are hardcoded within the shaders. With the hardcoded constants (also referred to as folding constants), the GPU may perform a retrieve operation as opposed to a calculation thereby making the process faster.

Figure 15:
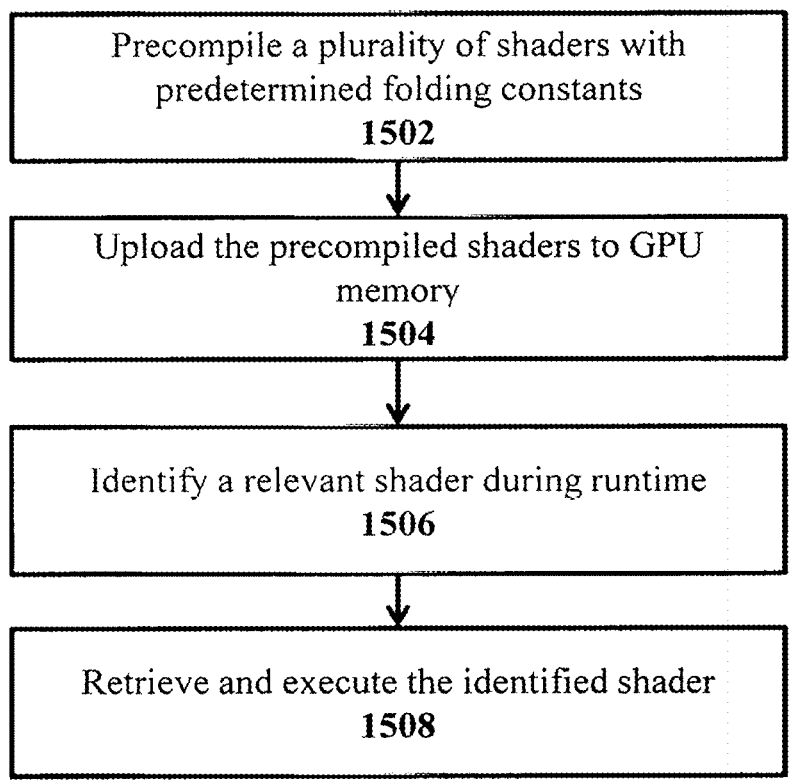
FIG. 15 shows an illustrative method of folding constants, according to an illustrative embodiment.

FIG. 15 shows an illustrative method 1500 for including folding constants in the shaders, according to the illustrative embodiment. The method may begin at step 1502, wherein the media engine may pre-compile a plurality of shaders with predetermined folding constants. For example, a shader of the plurality of shaders may be a blurring shader. A blurring shader may extract pixel values from a certain radius around a pixel and average the pixel values to generate a blurring effect. The radius may be dependent upon various runtime factors such as the size of the scene. A GPU determining a radius and performing calculations based on the determined radius may require several GPU cycles. To preempt such calculations, the media engine may pre-compile shaders with constant values baked into the shader. For example, the media engine may pre-compile blurring shaders with a radius of 3, 5, or 9. Another example may be indexes for a Gaussian blur. For example, the media engine may pre-compile Gaussian blur shaders with indices of 0, 1, and/or any other type of index. At step 1504, the media engine may upload the pre-compiled shaders to GPU memory to be accessed during runtime. For GPU allowing for pre-compiled shaders, the media engine may skip steps 1502 and 1504.

At step 1506, the media engine may identify a relevant shader during runtime. For example, a user or another program may provide instruction to execute the relevant shader. The instruction may contain the identification information of the relevant shader. At step 1508, the media engine may retrieve the identified shader from the GPU memory and execute the retrieved shader. In some embodiments, the media engine may use a combination of shaders. For example, if a blurring shader has to generate a blur with a radius of 6, the media engine may execute two passes of the blurring shader with the radius of 3. In some embodiments, the media engine may dynamically determine the folding constants during the runtime of media engine. For example, the media engine may determine that a blurring shader with a radius of 3 has been called 500 times in 2 seconds, and the media engine may indicate that a blurring shader with a folding constant of 3 has to be pre-compiled for the GPU to access during runtime.

An illustrative media engine may also perform an optimized screen space ambient occlusion (SSAO). The conventional technologies use ray tracing to track a path of rays of light from a source through multitudes of reflections and refractions, which may be computationally intensive for a GPU.

Figure 16:
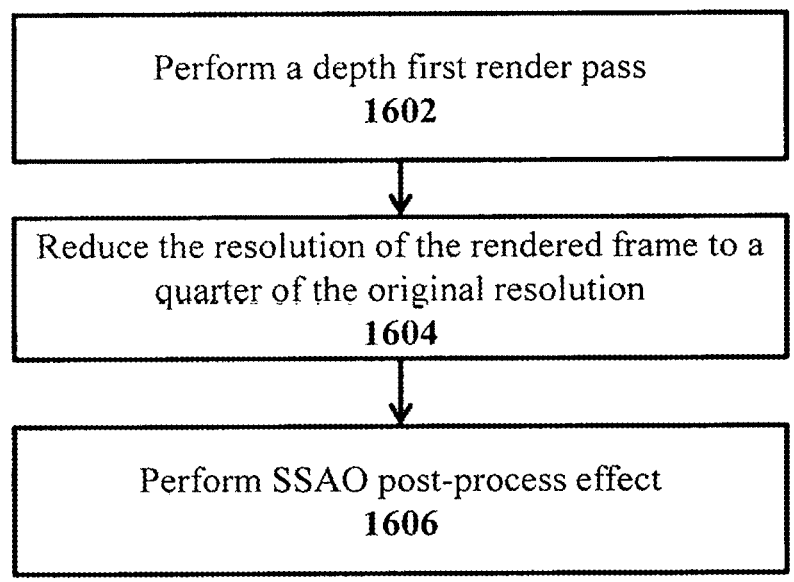
FIG. 16 shows an illustrative method of applying screen space ambient occlusion (SSAO), according to an illustrative embodiment.

FIG. 16 shows an illustrative method 1600 for SSAO, according to an illustrative embodiment. The method 1600 may begin at step 1602, where the media engine may perform a depth first render pass. In other words, the media engine may render all of the geometry without the textures and special effects. At step 1604, the media engine may reduce the resolution of the rendered frame to a quarter of the original resolution. The quarter resolution may represent a compromise between visual fidelity and performance. Reducing the frame to quarter of its resolution may reduce the kernel size and the depth buffer so that the calculations for the SSAO may be faster. In step 1606, the media engine may perform a SSAO post-process effect. In the SSAO post-processing, the media engine may use the SSAO algorithms as understood in the art. It should be understood that the SSAO is described herein only for illustrative purposes only and other form of indirect lighting calculations should be considered within the scope of this disclosure.

An illustrative media engine may also render an optimized vignette effect. The vignette effect may darken corners of the screen to reduce the unpleasantness of modern edge-lit screen design. To create a vignette effect, conventional algorithms draw additional vignette pixels over exiting pixels thereby increasing the GPU's fill rate.

Figure 17:
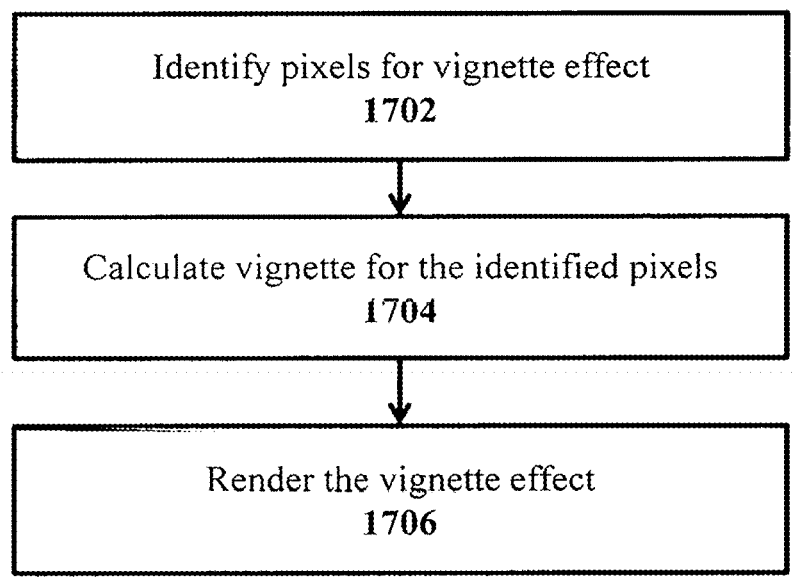
FIG. 17 shows an illustrative method of calculating vignette effect, according to an illustrative embodiment.

FIG. 17 shows an illustrative method 1700 that optimizes the calculation of the vignette effect. The method 1700 may begin at step 1702, where the media engine may identify pixels for the vignette effect. Such pixels may be the corner pixels. At step 1704, the media engine may calculate vignette for the identified pixels. It should be understood that this calculation may occur before the pixels are drawn. At step 1706, the media engine may render the vignette effect based on the calculations at step 1704.

Embodiments have been described pertaining to a highly optimized media engine that includes a display engine to display interactive digital content and/or a development tool for a user to generate and configure the interactive digital content. The media engine includes central processing unit (CPU) and/or graphics processing unit (GPU) optimizations such that the interactive digital content may be displayed on low powered devices such as smartphones, smartTVs, smartwatches, display kiosks, and various electronic devices with a processor. The media engine may further be platform-agnostic: configured to compiled on major compilers; and modular: where individual modules may be configured to modified and updated independently. The display engine, by leveraging the back-end CPU and/or GPU optimizations may provide for display high fidelity interactive content regardless of the processing power. The development tool may provide widgets that may be accessed and modified using simple scripting languages.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. The storage medium may be a transitory storage or a non-transitory storage. A transitory storage medium may include, for example and without limitation, signals containing instructions to be executed by a processor. A non-transitory computer-readable or processor-readable media includes, for example and without limitation, computer storage media and tangible storage media. A non-transitory processor-readable storage media may be any available media that may be accessed by a computer. By way of example, and without limitation, such non-transitory processor-readable media may comprise flash memory, RAM, ROM, EEPROM, CD-ROM, or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:
   a non-transitory storage medium comprising software modules forming a media engine;
   a processor coupled to the non-transitory storage medium to execute the software modules to:
   receive a first graphics object and a second graphics object to be displayed;
   generate a first set of one or more computer processes for the first graphics object and a second set of one or more computer processes for the second graphics object;
   discretize at least one of the first set of computer processes and the second set of computer processes into a plurality of discrete computation tasks;
   determine a number of threads supported by a hardware capacity of a target processor; and provide the plurality of computation tasks as multiple threads based on the number of the threads supported by the hardware capacity of the target processor.

2. The system of claim 1, wherein the processor further executes the software modules to:
provide instructions to perform one or more single instruction multiple data operations based on the plurality of discrete computation tasks.

3. The system of clam 1, wherein the architecture of the target processor is selected from the group consisting of x86, x86_64, and ARM.

4. The system of claim 1, wherein the first graphics object and the second graphics object are independent video feeds.

5. The system of claim 1, wherein the processor further executes the software modules to:
identify a critical discrete computation task among the plurality of discrete computation tasks; and
utilize single instruction multiple data resources for the critical discrete computation tasks such that the target processor uses the target processor registers or cache for writing and reading pieces of binary information.

6. A system comprising:
a non-transitory storage medium comprising software modules forming a media engine;
a central processing unit (CPU) coupled to the non-transitory storage medium to execute software modules to:
retrieve a first graphics object and a second graphics object to be displayed;
generate a first set of one or more central processing unit (CPU) processes for the first graphics object and a second set of one or more CPU processes for the second graphics object;
discretize at least one of the first set of CPU processes and the second set of CPU processes into a plurality of discrete computation tasks;
determine a number of threads supported by a hardware capacity of the CPU;
feed the plurality of discrete computation tasks as multiple threads based on the number of the threads supported by the hardware capacity of the CPU; and
perform asynchronous pixel transfers of the first graphics object and the second graphics objects such that the first graphics object and the second graphics object are shown independently in a single frame, the asynchronous pixel transfers including batching of draw calls to a graphics processing unit (GPU) based on the similarity of meshes in the first graphics object and the second graphics object to generate a batch of draw calls.

7. The system of claim 6, wherein the first graphics object and the second graphics object are independent video feeds.

8. The system of claim 7, wherein the CPU further executes the software modules to:
project at least one of the first graphics object and the second graphics object by applying a barrel distortion filter and further applying a Panini effect.

9. The system of claim 6, wherein the CPU further executes the software modules to:
compile one or more shaders each with a predetermined parameter during load time;
store the pre-compiled one or more shaders in one or more non-transitory storage media; and
identify a relevant shader of the one or more shaders during runtime.

10. The system of claim 9, wherein the predetermined parameter is a blurring radius for a blurring shader.

11. The system of claim 9, wherein the predetermined parameter is an index for a Gaussian blurring shader.

12. The system of claim 6, wherein the CPU receives requests to access and configure the first graphics object and the second graphics object through a scripting language.

13. The system of claim 6, wherein the CPU load the batch calls into a command buffer for processing the GPU.

14. The system of claim 6, wherein the CPU further executes the software modules to:
identify a critical discrete computation task among the plurality of discrete computation tasks; and
instruct the CPU to utilize single instruction multiple data resources for the critical discrete computation tasks such that the CPU uses the CPU registers or cache for writing and reading pieces of binary information.

15. The system of claim 6, wherein the CPU further executes the software modules to:
identify a stopping point during the rendering of the first graphics object and the second graphics object; and
initialize a GPU memory at the stopping point.

16. The system of claim 6, wherein the CPU further executes the software modules to:
divide a frame including the first graphics object and the second graphics object into a plurality of tiles;
perform dynamic lighting calculations for one or more tiles and implement a light accumulation buffer to store the dynamic lighting calculations for one or more tiles;
apply dynamic lighting calculations in the light accumulation buffer to one or more tiles in a future frame in response to determining by the CPU that the dynamic lighting calculation for the one or more tiles in the future frame have not changed.

17. The system of claim 16, wherein the CPU further executes the software modules to:
determine that a first set of tiles are occluded from dynamic lights; and
apply a stencil buffer on the first set of tiles to avoid calculating the dynamic lights for the first set of tiles.

18. The system of claim 6, wherein the CPU further executes the software modules to:
identify an instance within at least one of the first graphics object and the second graphics object that has to be rendered multiple times;
calculate delta values for each instance to be rendered; and
generate draw calls for the identified instance and the delta values for processing by the GPU.

19. The system of claim 6, wherein the CPU further executes the software modules to:
compile a permutation of shaders during load time;
store the pre-compiled permutation of shaders in one or more non-transitory storage media;
identify a relevant shader during runtime; and
forward the identified shader for processing by the GPU.

20. The system of claim 6, wherein the CPU further executes the software modules to:
identify a plurality of pixels in a frame for a vignette effect;
calculate vignette effect for the identified pixels for rendering the vignette effect; and
forward the vignette effect for the identified pixels for rendering of the vignette effect by the GPU.

21. A graphics system comprising:
a non-transitory storage medium comprising one or more software modules of a media engine;

a first processor coupled to the non-transitory storage medium capable of executing at least one of the software modules to:
identify a plurality of graphics objects to be displayed;
select a set of processes for each of the plurality of graphics objects;
determine a number of threads supported by the first processor, wherein processes of the sets of processes are provided as multiple threads based on the determined number of threads supported by the first processor;
batch draw calls into one or more sets of batched draw calls associated with more than one graphics object;
provide one or more sets of batched draw calls to a buffer;
a second processor, coupled to the buffer, that is able to:
receive one or more sets of batched draw calls; and
perform asynchronous transfers of the more than one graphics object such that the plurality of graphics objects are independently included in a single frame.

* * * * *